US 6,733,915 B2

(12) United States Patent
Barton et al.

(10) Patent No.: US 6,733,915 B2
(45) Date of Patent: May 11, 2004

(54) GAS DIFFUSION BACKING FOR FUEL CELLS

(75) Inventors: Kelly Barton, Athens, PA (US); Shoibal Banerjee, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/308,290

(22) Filed: Dec. 2, 2002

(65) Prior Publication Data

US 2003/0157397 A1 Aug. 21, 2003

Related U.S. Application Data

(60) Provisional application No. 60/343,845, filed on Dec. 27, 2001.

(51) Int. Cl.⁷ .................................................. H01M 8/10
(52) U.S. Cl. .............................. 429/34; 429/38; 429/39
(58) Field of Search .............................. 429/34, 38, 39

(56) References Cited

U.S. PATENT DOCUMENTS

| | | | |
|---|---|---|---|
| 4,447,505 A | 5/1984 | Blanchart | |
| 4,885,217 A | * 12/1989 | Hoge | 429/27 |
| 4,975,172 A | 12/1990 | Yeager et al. | |
| 5,418,091 A | 5/1995 | Gozdz et al. | |
| 5,561,000 A | 10/1996 | Dirven et al. | |
| 5,620,807 A | 4/1997 | Mussell et al. | |
| 5,677,074 A | 10/1997 | Serpico et al. | |
| 5,783,325 A | 7/1998 | Cabasso et al. | |
| 5,998,058 A | 12/1999 | Fredley | |
| 6,010,628 A | 1/2000 | Akhatovick et al. | |
| 6,024,848 A | 2/2000 | Dufner et al. | |
| 6,083,638 A | 7/2000 | Taniguchi et al. | |

FOREIGN PATENT DOCUMENTS

| | | | |
|---|---|---|---|
| CA | 2 380 427 | * | 12/2001 |
| EP | 0 917 226 A2 | | 5/1999 |
| EP | 1 063 717 A2 | | 12/2000 |
| EP | 1 150 369 A1 | | 10/2001 |
| JP | 9-200760 | | 7/1997 |
| WO | WO 00/54350 A1 | | 9/2000 |
| WO | WO 00/67336 | | 11/2000 |
| WO | WO 01/17050 A1 | | 3/2001 |
| WO | WO 01/93356 | | 12/2001 |

OTHER PUBLICATIONS

E. Peled, T. Duvdevani, A. Aharon and A. Melman, A Direct Methanol Fuel Cell Based on a Novel Low–Cost Nanoporous Proton–Conducting Membrane, Electrochemical and Solid–State Letters, Ieee Service Center, Piscataway, NJ, USA, vol. 3, No. 12, 525–528 (2000).

International Search Report for PCT/US02/40334, May 2003.

P. Staiti, Z. Poltarzewski, V. Alderucci, G. Maggio and N. Giordano, Solid Polymer Electrolyte Fuel Cell (SPEFC) Research and Development at the Institute CNR–TAE of Messine, Int. J. Hydrogen Energy, vol. 19 No. 6 pp. 523–527, 1994.

Karl V. Kordesch and Julio Cesar Tambasco De Oliveira, Fuel Cells, Ullman's Encyclopedia of Industrial Chemistry, v12a, 5ᵗʰ ed. p. 55–83, 1989.

* cited by examiner

*Primary Examiner*—Hoa Van Le

(57) ABSTRACT

A gas diffusion backing for fuel cells wherein a porous carbonaceous paper or fabric, impregnated with a first fluorinated polymer, bears a microporous coating of a second fluorinated polymer admixed with carbon particles. Also, a process for making the composite wherein the fluorinated polymers are coalesced by heating above their glass transition temperature or melting point is described. A membrane electrode assembly prepared using these gas diffusion backing and a fuel are also provided.

49 Claims, 4 Drawing Sheets

GAS DIFFUSION BACKING FOR FUEL CELLS

FIELD OF THE INVENTION

The present invention relates to a gas diffusion backing for use in fuel cells, a process for fabricating the gas diffusion backing, membrane electrode assemblies containing the gas diffusion backing and fuel cells containing said membrane electrode assemblies.

BACKGROUND OF THE INVENTION

Hydrogen and methanol fuel cells are of considerable importance in the search for new energy technologies, see for example, Ullmann's Encyclopedia of Industrial Chemistry, 5th ed. Vol. 12A, pp. 55ff, VCH, New York, 1989. Fuel cells utilize the reaction of hydrogen and oxygen to produce electricity. Reaction may be a direct reaction between hydrogen and oxygen, or between a hydrocarbon and oxygen, such as in the so-called direct methanol fuel cell. In either case, water is an unavoidable by-product of reaction. Efficient operation of a fuel cell requires continuous simultaneous delivery of reactants to the catalyst layers or electrodes and, on the cathode side, removal of water from the neighborhood of the catalyst layer or electrode. In the case of fuel cells employing polymer electrolyte membranes (PEM) such as Nafion® ionomer membrane available from E. I. du Pont de Nemours and Company, there is the further complicating factor that the membrane must be kept wet for good fuel cell performance. Thus, in the case of fuel cells utilizing PEM, "water management" is a complex problem for which numerous solutions have been proposed in the art. See Yeager et al, U.S. Pat. No. 4,975,172 for an example of such cells.

It has become common practice to incorporate fluoropolymers in the catalyst layer and gas diffusion backing to impart a degree of hydrophobicity to otherwise hydrophilic structures, an example being the use of polytetrafluoroethylene (PTFE) or copolymers thereof with hexafluoropropylene or a perfluorovinyl ether. (See Blanchart, U.S. Pat. No. 4,447,505, Yeager, op. cit., and Serpico et al, U.S. Pat. No. 5,677,074.) More recently, Kumar et al, WO 0067336, have disclosed the use of amorphous fluoropolymers for treating carbon fiber papers and fabrics to achieve enhanced hydrophobicity.

On the anode side of a PEM fuel cell, there is a tendency for the membrane to dry out as a result of what is known in the art as proton-drag. On the cathode side, there is a tendency towards flooding of the cathode by both the by-product water and net transport of water across the membrane by proton-drag. Thus it is necessary to provide a means for transporting water to the anode and away from the cathode.

The problem is further complicated by the need to continuously supply reactant (or fuel) gases, or in certain cases liquids, to the electrodes. The presence of a layer of liquid water at the electrodes, and in the channels leading to them, serves as a barrier to the reactants, degrading fuel cell performance.

The art provides numerous schemes for providing a balance between the water transport requirements and the reactant transport requirements. Among these schemes are several involving employment of a carbon fiber fabric or paper which has been treated to alter its wettability. These carbon fiber or carbon paper structures are known in the fuel cell art as gas diffusion backings (GDBs), and that is the term employed herein to mean carbon fiber and carbon paper structures, both treated and untreated, that are suitable for employment as GDBs in fuel cells.

Taniguchi et al, U.S. Pat. No. 6,083,638, discloses a fibrous carbon substrate pre-treated with a fluororesin which is baked at 360° C., followed by treatment with particulate dispersions of hydrophobic and hydrophilic polymer to form discrete channels which are hydrophobic and hydrophilic.

Isono et al, EP 1 063 717 A2, discloses a fibrous carbon substrate treated with a high temperature fluoropolymer in aqueous dispersion in such a manner as to exhibit a gradient in hydrophobicity in a direction normal to the direction of ion transport through the cell. The fibrous carbon substrate is further treated with a mixture layer comprising the same aqueous dispersion, and exhibiting a similar gradient in hydrophobicity. The entire structure is subject to heating to 380° C. to coalesce the polymer.

Cipollni, WO 01/17050 A1, discloses a porous carbon body with increased wettability by water which is achieved by treating a carbon fabric or paper with a solution of a metallic oxide hydrates among others, particular SnO2.

Fredley, U.S. Pat. No. 5,998,058, discloses the porous carbon body of Cipollni, op. cit., which has been further treated so that some of the interstices between the fibers of the porous carbon body are coated with polytetrafluoroethylene, thereby creating an intermixed network of hydrophilic and hydrophobic channels.

Dufner et al, U.S. Pat. No. 6,024,848, disclose the porous carbon body of Fredley, op. cit., further treated by application of a contact bilayer in the form of a coating deposited on the carbon substrate where the coating is made up of a combination of a hydrophobic and a hydrophilic polymer, the hydrophobic polymer being a copolymer of tetrafluoroethylene and hexafluropropylene, and the hydrophilic polymer being a perfluorinated ionomer.

Dirven et al, U.S. Pat. No. 5,561,000, discloses a bilayer structure in which a fine pore layer consisting of PTFE and carbon is deposited by coating onto a PTFE-treated carbon paper or fabric.

Gorman et al, WO 00/54350, disclose a variation on the bilayer of Dirven et al, op. cit., wherein the coarse pore layer, or carbon paper or fabric, is treated to be hydrophilic, but fail to disclose any manner in which such hydrophilic character may actually be realized.

U.S. Pat. No. 5,620,807 (Dow) describes 2 layer structures comprised of a small pore region and a large pore region. The large pore region is oriented against the bipolar plate, the small pore region oriented against the catalyst layer. The large pore region consists of a porous carbon paper. The small pore region is film coated from solvents.

Porous films and coating comprising polyvinylidene fluoride are known. For example Gozdz et al. (U.S. Pat. No. 5,418,091) disclose porous PVDF homopolymer and copolymer containing solutions of lithium salts in aprotic solvents useful as separators in lithium batteries.

SUMMARY OF THE INVENTION

In the first aspect, the invention provides gas diffusion backing adapted for use in fuel cells consisting essentially of a porous first layer and a microporous second layer in electrically conductive contact therewith, said first layer consisting essentially of a porous carbonaceous paper or fabric comprising carbon fibers, wherein the carbon fibers comprise at least 50% by volume of the layer, said fibers being at least partially coated by a first fluorinated polymer disposed thereupon, and said second layer consisting essentially of a second fluorinated polymer having carbon particles intermixed therewith, the first and second fluorinated polymers (i) being the same or different, (ii) each being a melt processable polymer selected from the group consisting of
- (a) amorphous polymers having a glass transition temperature (Tg) of less than about 250° C.;
- (b) crystalline or semi-crystalline polymers having a melting point of less than about 315° C., more typically less than about 265° C., and still more typically less than about 250° C.; and
- (c) mixtures thereof.

In the first aspect, the first and second fluorinated polymers may have a weight average molecular weight of less than 500,000 Daltons.

In the first aspect, the invention further provides a microporous layer applied from a composition comprising a second fluorinated polymer, carbon particles, a first component, e.g. a solvent, typically having a boiling point of less than about 100° C., and a second component, typically having a boiling point of at least about 100° C., wherein the second component has a boiling point greater than that of the first component. The high boiling component may be a plasticizer or a solvent.

In the first aspect, the invention further provides first and second fluorinated polymers selected from the group consisting of a fluorinated ionomer comprising at least 6 mole % of monomer units having a fluorinated pendant group with a terminal ionic group; a copolymer or terpolymer comprising polyvinylidene fluoride and hexafluoropropylene; and mixtures thereof.

In a second aspect, the invention provides a process for forming a gas diffusion backing comprising:
- (W) contacting a porous carbonaceous paper or fabric comprising carbon fibers with a first fluorinated polymer to impregnate said first fluorinated polymer into the paper or fabric and at least partially coat said fibers, thereby forming a porous first layer containing at least 50% by volume of carbon fibers;
- (X) applying a second layer to the first layer from a composition comprising a second fluorinated polymer, carbon particles, a first component, e.g. a solvent, typically having a boiling point of less than about 100° C., and a second component, typically having a boiling point of at least about 100° C., wherein the second component has a boiling point greater than that of the first component, and wherein the first and second fluorinated polymers are (i) the same or different, (ii) each comprises a melt processable polymer selected from the group consisting of
  - (a) amorphous polymers having a glass transition temperature (Tg) of less than about 250° C.;
  - (b) crystalline or semi-crystalline polymers having a melting point of less than about 315° C., more typically less than 265° C., and still more typically less than about 250° C.; and
  - (c) mixtures thereof;
- (Y) drying the first and second layers after each of steps (W) and (X), or after completion of step (X) to remove the low boiling solvent; and
- (Z) heating the first and second layers individually, or after they have been brought into contact, to form the gas diffusion backing having a microporous second layer in electrical contact with the first layer.

In the second aspect, the invention provides applying, in step (X), by coating or lamination.

In a third aspect, the invention provides a membrane electrode assembly comprising:
- (a) a solid polymer electrolyte membrane;
- (b) at least one electrode; and
- (c) a gas diffusion backing consisting essentially of a porous first layer and a microporous second layer in electrically conductive contact therewith, said first layer consisting essentially of a porous carbonaceous paper or fabric comprising carbon fibers, wherein the carbon fibers comprise at least 50% by volume of the layer, said fibers being at least partially coated by a first fluorinated polymer disposed thereupon, and said second layer consisting essentially of a second fluorinated polymer having carbon particles intermixed therewith, the first and second fluorinated polymers (i) being the same or different, (ii) each being a melt processable polymer selected from the group consisting of
  - (a) amorphous polymers having a glass transition temperature (Tg) of less than about 250° C.;
  - (b) crystalline or semi-crystalline polymers having a melting point of less than about 315° C., more typically less than about 26° C., and still more typically less than about 250° C.; and
  - (c) mixtures thereof.

In a fourth aspect, the invention provides a fuel cell comprising membrane electrode assembly, wherein the membrane electrode assembly comprises:
- (a) a solid polymer electrolyte membrane;
- (b) at least one electrode; and
- (c) a gas diffusion backing consisting essentially of a porous first layer and a microporous second layer in electrically conductive contact therewith, said first layer consisting essentially of a porous carbonaceous paper or fabric comprising carbon fibers, wherein the carbon fibers comprise at least about 50% by volume of the layer, said fibers being at least partially coated by a first fluorinated polymer disposed thereupon, and said second layer consisting essentially of a second fluorinated polymer having carbon particles intermixed therewith, the first and second fluorinated polymers (i) being the same or different, (ii) each being a melt processable polymer selected from the group consisting of
  - (a) amorphous polymers having a glass transition temperature (Tg) of less than about 250° C.;
  - (b) crystalline or semi-crystalline polymers having a melting point of less than about 315° C., more typically less than about 265° C., and still more typically less than about 250° C.; and
  - (c) mixtures thereof.

DETAILED DESCRIPTION OF THE INVENTION

The present invention provides a gas diffusion backing adapted for use in a fuel cell. The backing has a porous carbon paper or fabric impregnated with a first fluorinated polymer as a first layer and a microporous layer of a second fluorinated polymer, which contains carbon particles, in electrically conductive contact therewith. The first and second fluorinated polymers may be the same or different. In one embodiment of the present invention, the first fluorinated polymer is hydrophobic and the second fluorinated polymer is hydrophobic. In another embodiment, the first fluorinated polymer is hydrophilic and the second fluorinated polymer is hydrophilic. In a further embodiment, the first fluorinated polymer is hydrophilic and the second fluorinated polymer is hydrophobic. Alternately, the first fluorinated polymer may be hydrophobic and second fluorinated polymer hydrophilic.

The term "hydrophilic", as used herein, means that the fluoropolymer exhibits a surface contact angle with water of less than about 90°, preferably about 0°, indicating that water will spontaneously spread over the surface to cover it. Hydrophilic materials are typically materials having surface energies higher than that of water, such as metals or ceramics, or possessing dipolar moieties, in particular ionic groups, to which water exhibits a physical affinity. In particular, hydrophilic materials according to the present invention are polymeric materials having ionic moieties.

The term "hydrophobic", as used herein, means that the fluoropolymer exhibits a surface contact angle with water of greater than about 90°, preferably greater than about 120°, most preferably greater than 140°, indicating that water in contact with the surface will not spread spontaneously over the surface to cover it, and will preferably simply bead upon the surface forming loose droplets. Hydrophobic materials are those which exhibit surface energies less than that of water, such as most polymers, and little or no dipolar character. For the purposes of the present invention hydrophobic materials are polymers generally known to exhibit low surface energies, and which are devoid of ionic functionality.

Gas Diffusion Backing

The composite diffusion backings are suitable for use in fuel cells in general, and fuel cells that utilize fuels in the liquid or gaseous phase, for example hydrogen or organic fuels, including liquid organic fuels such as methanol, in particular. The specific design of the fuel cell will dictate which embodiment of the present invention is best suited for use in that configuration. While those skilled in the art will understand the design criteria used to select the embodiment best suited to a specific application, the testing methods described herein also will be useful for that purpose.

Figure 1:
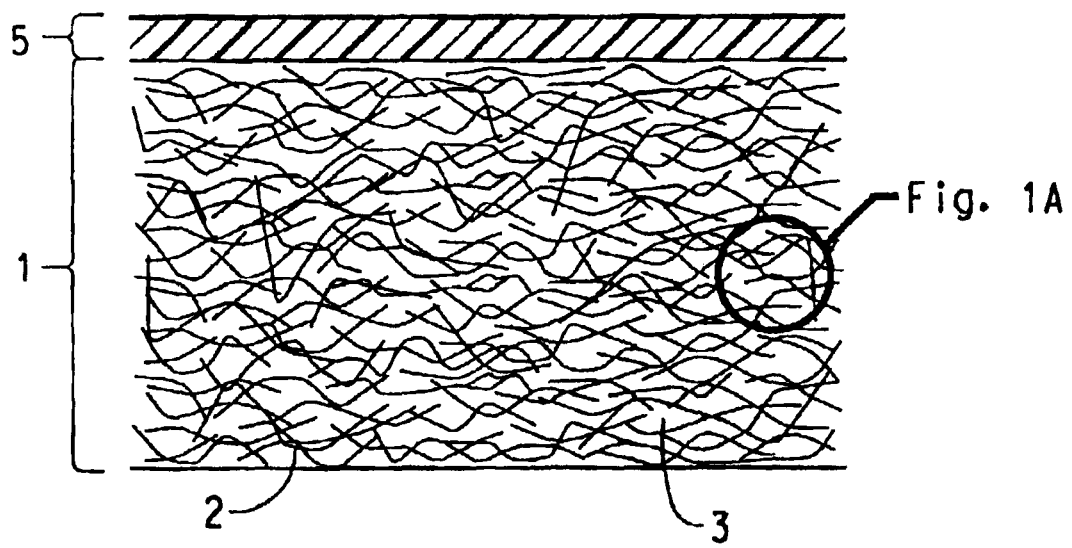
FIG. 1 is a cross-section that illustrates an embodiment of the composite gas diffusion backing of this invention wherein a carbonaceous paper impregnated with a fluorinated polymer, 1, bears a microporous layer, 5, of a fluorinated polymer that contains carbon particles.
Figure 1A:
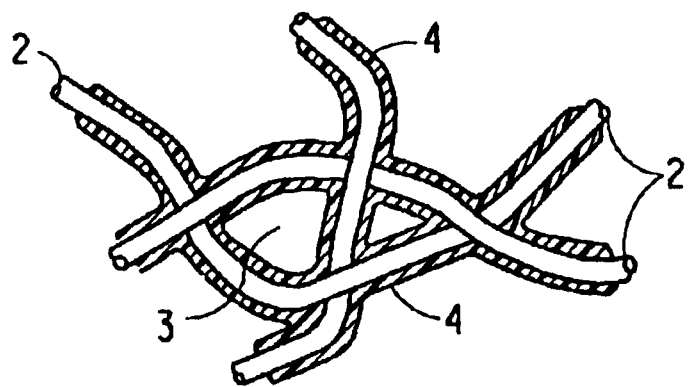
FIG. 1a is an expanded view of layer 1.

FIGS. 1 and 1A depict an embodiment of the present invention wherein a porous carbonaceous paper, 1, having randomly oriented carbon fibrils, 2, and interstices among the fibrils, 3, contains a coalesced polymer film of a first fluorinated polymer that forms a thin coating, 4, on the fibrils. The coating may be continuous or discontinuous, depending on the amount of fluorinated polymer used and the design needs for the particular gas diffusion backing. Microporous layer 5 consists essentially of a second fluorinated polymer that contains carbon particles (not shown), and thus is electrically conductive. Typically layer 5 will be coated or laminated directly onto the carbonaceous paper, and thus be in electrically conductive contact. An intermediate layer may be present, between the paper and microporous layer, provided that it is sufficiently porous and electrically conducting to achieve the purposes of the invention.

Carbon Paper or Fabric

Any type of carbon paper or fabric known in the art as a gas diffusion backing material may be selected in practicing the invention. Representative commercially available materials that can be selected to advantage include TPG grades from Toray, Panex PW-03 from Zoltek, Sigracet GDL 10AA from SGL, Technimat from Lydell, and Spectracarb from Spectracorp.

First and Second Fluorinated Polymer

Suitable fluorinated polymers are thermoplastic fluoropolymers that coalesce into continuous three-dimensional networks at temperatures below about 315° C., e.g. Teflon® PFA, more typically below about 265° C., and still more typically below about 250° C.; and most typically below about 200° C., without the application of any shear forces. These polymers may be amorphous, crystalline or semicrystalline The fluoropolymer selected for use in making either layer of the gas diffusion layer may be hydrophilic or hydrophobic, depending on the preference of the particular fuel cell designer.

Many hydrophobic fluoropolymers meeting that criteria are well-known in the art, and all are suitable for use in the invention. These include crystalline or semi-crystalline fluorinated polymers such as copolymers and terpolymers of vinylidene fluoride and PTFE with each other and with comonomers such as hexafluoropropylene, perfluoroalkylvinylethers, and perfluorosulfonylfluoride-alkoxyvinylethers. Typically these fluorinated polymers have a weight average molecular weight of less than about 500,000 Daltons, more typically about 400,000 to about 500,000 Daltons and a melting point range of about 140 to about 315° C. Typically these fluorinated polymers have a melt index of 1 to about 15 g/10 min, preferably about 4 to about 6 g/10 min, more preferably, about 5 g/10 min. This class of fluoropolymers are referred to as 'melt processable' or 'melt fabricable' meaning that these polymers can be processes by conventional melt extruding means. At these extrusion temperatures the polymers must exhibit melt viscosities of less than about $10^7$ poise, preferably between about $10^3$ to about $10^7$ poise, and most preferably about $10^4$ to about $10^6$ poise and a melting point in the range of range of about 140 to about 315° C. Particularly suitable are copolymers of vinylidene fluoride and hexafluoropropylene, and copolymers of TFE and a monomer represented by the formula:

$$CF_2=CF-[O-CF_2CF(R)]_a-OCF_2CF_2SO_2F$$

wherein a is 0, 1 or 2, and R is F, or $C_nF_{2n+1}$ wherein n is 1, 2, 3, or 4. Most preferably, R is $-CF_3$ and a is 1.

Fluorinated polymers suitable for use as hydrophobic polymers in the invention include commercially available polymers such as Kynar® from AtoChem, Teflon® FEP, Teflon® PFA, all from E. I. du Pont de Nemours and Company, having a melting point of less than about 315° C., more typically less than about 265° C., and still more typically less than about 250° C. Particularly well-suited are Kynar®.

Both crystalline, semi-crystalline and amorphous fluoropolymers are suitable for the practice of the present invention. The term "crystalline" as used herein refers to polymers that exist in a semi-crystalline morphology at room temperature or under conditions of use in an operating fuel cell. Similarly, the term "amorphous" as used herein refers to polymers that exist in a non-crystalline glassy morphology at room temperature or under conditions of use in an operating fuel cell. A polymer exhibiting flow at the coalescence temperature, will necessarily be non-crystalline and above its glass transition temperature. Fluorinated ionomeric polymers that are semi-crystalline and suitable for use in the invention as hydrophilic polymers include ionomers comprising monomer units represented by the formula

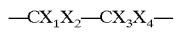

where each X is independently a halogen or fluorine, with the proviso that at least two of $X_{1-4}$ are fluorines; and a perfluoroalkenyl polymer prepared from monomer units having an ionic pendant group represented by the formula:

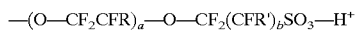

wherein R and R' are independently selected from F, Cl or a perfluorinated alkyl group having 1 to 10 carbon atoms, a is 0, 1 or 2, b is 0 to 6. Preferably, $X_{1-4}$ are all fluorines, and R is perfluoromethyl; a is 0 or 1; R' is F, and b is 1. Most preferably, a is 1. Preferably, the ionic monomer unit is present at a concentration of up to 20 mol-% in the ionomeric polymer. Nafion® perfluoroionomer available from the E. I. du Pont de Nemours and Company, Wilmington, Del., is an example of a commercially available ionomeric polymer most preferred for the practice of the present invention. More typically used is Nafion® ionomer resin in the sulfonyl fluoride form that is semicrystalline and has a weight average molecular weight of less than 500,000 Daltons, more typically about 50,000 to about 100,000 Daltons and a melting point of 260° C. Due to the acid function of these ionomers, these polymers are often characterized by equivalent weight. Typically, the average equivalent weight is less than about 1500, more typically about 1000 to about 1100.

Other fluorinated polymers suitable for the practice of the present invention include so-called amorphous fluoropolymers, which are copolymers of tetrafluoroethylene (TFE) with comonomers from the group of hexafluoropropylene (HFP); perfluoroalkyl vinyl ethers; 2,2-bistrifluoromethyl-4,5-difluoro-1,3-dioxole (PDD); Teflon® AF having a Tg in the range of 160° C. to 240° C., and a weight average molecular weight in the range of about 500,000 Daltons to about 770,000 Daltons, and mixtures thereof. Preferably, the concentration of TFE monomer units is 80 mol % or less and the concentration of the comonomer is at least 20 mol %. Most preferred are a terpolymer comprising 60 mol % TFE, 26 mol % perfluoromethyl vinyl ether, and 14 mol % perfluoroethylvinyl ether, and a copolymer of TFE and PDD comprising 67 mol % PDD which has a weight average molecular weight of less than about 500,000 Daltons, and a glass transition temperature of about 250° C., typically between about 160 and about 240° C., and more typically below about 200° C.

The copolymers of TFE with HFP or perfluoro alkyl vinyl ethers preferred for the practice of the invention, and methods for their synthesis, are described in Anolick et al U.S. Pat. No. 5,663,255, while those of TFE and PDD are described in Squire, U.S. Pat. No. 4,754,009.

Carbon Particles

Typically, carbon particles are used to impart good electrical conductivity to the second layer of the gas diffusion backing. Any form of carbon used in the art may be selected in practicing the invention. Representative carbons include, but are not limited to, Vulcan® XC72 carbon from Cabot Corp, Billerica, Mass.; SP Carbon & Ensaco 350 both from MMM Carbon, Brussels, Belgium; and Applied Science Graphite Fibers from Applied Sciences, Inc., Cedarville, Ohio. Typical useful carbons have a surface area in the range of about 50 to about 800 $m^2$/gram.

First Component

The second layer, applied to the carbon paper or cloth having impregnated therein the first fluorinated polymer, typically contains a first component that is a low boiling solvent and that is used to dissolve or disperse the second fluorinated polymer. Some suitable solvents include acetone, methanol and methylene chloride.

Second Component

The second layer, applied to the carbon paper or cloth having impregnated therein the first fluorinated polymer, may contain a second component, that is a high boiling component and is selected from the group consisting of a plasticizer or solvent, that is employed to impart porosity in this layer. There are several plasticizers available that can serve this function. Typically, the plasticizers are selected from the group consisting of propylene carbonate, dibutyl phthalate, tri-butyl phosphate and ethylene glycol, with propylene carbonate being the preferred plasticizer. These chemicals exhibit the physical properties required to effect the porosity of this layer. These properties include a normal boiling point of the higher boiling second component that is significantly above that of the first component, i.e. solvent(s) used in the slurry, enabling the second component to remain in the film after the initial drying stage that removes most of the first component. Typically the boiling point of the higher boiling second component is above about 100° C., more typically about 150° C. are adequate. Typically the higher boiling second component is a relatively good solvent for the polymer in the slurry. Typically the solubility parameter for the higher boiling second component, e.g. plasticizer or solvent, is from 10 to 17 (cal/ml)0.5, with the preferred value being 12 to 14 (cal/ml)0.5.

Process

In the process of the invention, the carbon paper or fabric may be immersed in a solution or dispersion of the first fluorinated polymer for a period of time sufficient for the carbon paper or fabric to absorb the desired amount of the first fluorinated polymer. The immersion time may be as little as about 30 seconds or as long as several minutes. The concentration of the first fluorinated polymer in the solution or dispersion will also determine the concentration in the paper or fabric. Typical concentrations of the first fluorinated polymer, in solution or dispersion, are in the range of about 0.1% by weight to about 10% by weight.

It has been found satisfactory, in the specific examples that follow, for the immersion to be accomplished at room temperature in air. It also was observed that the final concentration of first fluorinated polymer in the treated carbon paper or fabric is far less sensitive to the duration of contact with the first fluorinated polymer solution than it is to the concentration of the first fluorinated polymer in the solution. Therefore, it has been found that the best results are obtained, in both batch and continuous treatment processes, if solvent evaporation is minimized to prevent the solution from slowly becoming more concentrated. This is conveniently achieved by operating at the lowest practical temperature or by operating in a sealed and/or pressurized treatment chamber.

The desired amount of the first fluorinated polymer in the paper or fabric will vary with selected fluorinated polymer, paper, and fabric. In order to obtain the desired result, the amount should be sufficient to at least partially, and preferably completely, coat the individual fibrils after drying. But the amount should not be so large that voids in the paper or fabric are unduly clogged to the extent that performance is adversely effected. The desired loading may be achieved by varying the concentration of the selected fluorinated polymer in solution or colloidal dispersion, and its contact time with the selected paper or cloth.

Following immersion, the treated paper or fabric is dried. Drying in air at room temperature overnight (typically 12 to 16 hours) is sufficient. Drying in an inert atmosphere and/or under vacuum, however, also is acceptable and may provide a shorter drying cycle. The desired concentration of the first fluorinated polymer in the paper or fabric typically is in the range of 0.05 to 25 mg/cm$^2$, preferably 0.25 to 10 mg/cm$^2$, where the area refers to the bulk area of one side of the paper or fabric. In cases where the paper or fabric is treated with a colloidal dispersion the treated paper or fabric may be heated to a temperature sufficient to cause the first fluorinated polymer to melt coalesce. This temperature is typically above the melting point of the first fluorinated polymer, or, in the case of an amorphous first fluorinated polymer, above its glass transition temperature. The thermal coalescence step may be deferred until after the second layer comprising the second fluorinated polymer/particles is applied, as described below.

A slurry or solution containing a mixture of the second fluorinated polymer, carbon particles, and the first and second components having different boiling points, is then applied in the form of a coating on the carbon paper or fabric. Typically, removal of the higher boiling second component, e.g. plasticizers, having a boiling point of at least 100° C., more typically about 150° C., imparts porosity in the micro-porous layer after drying, which could include heating of the applied solution. While the coating typically will be applied only on the side that will contact the catalyst layer of the catalyst-coated membrane, the coating could be applied to both sides if so desired.

Alternatively, the coating could be formed on a substrate having a release surface, such as a polyester or polyimide film, and subsequently transferred to the impregnated carbon paper or fabric. The coating is conveniently applied using a conventional coating technique, such as solution coating using a doctor knife or Meyer rod, screen printing, decal transfer, a printing plate, slot die extrusion, or the like. A typical slurry or solution used for this purpose contains about 1 to 20% by weight of the second fluorinated polymer, about 1 to about 40% by weight of carbon particles, with the balance being the dispersant or low boiling solvent and at least one high boiling component such as a plasticizer, if present.

After the coating layer is applied, it is dried. Overnight drying in air, at room temperature, generally has been found to be satisfactory, but alternative means, such as drying in a vacuum oven under nitrogen purge, are also acceptable and may be preferred in some circumstances. Drying at elevated temperatures such as about 35° C. to about 150° C. is also acceptable. After drying, the two layer gas diffusion backing may be heated to a sufficiently high temperature for the thermoplastic fluorinated polymer to melt coalesce. This temperature will be above the melting point of the fluorinated polymer, or, in the case of an amorphous fluorinated polymer, above its glass transition temperature. Both the first fluorinated polymer impregnated in the carbon paper or fabric, and the second fluorinated polymer, may be coalesced in the same heat treatment step.

The second layer (i.e., layer 5) in the composite gas diffusion backing so formed has a thickness of about 1 to about 100 microns, preferably between about 8 and about 16 microns, and has a coating weight of about 0.1 to about 20, preferably between about 0.8 and about 1.2, mg per square centimeter. In order to be useful in fuel cells, the layer so formed has a network of open micropores providing channels for the passage of water and reactant gases from one side to the other. Typically the micropores will constitute about 50% to about 85% of the layer, by volume, and have a mean pore size in the range of about 0.01 to about 5 microns.

Selection of the particular carbon particles (e.g. size and aspect ratio), first fluorinated polymer, and dispersant or low boiling solvent, loading level of the carbon particles and the second fluorinated polymer in the dispersant or solvent, as well as drying and coalescing conditions, will influence the level of porosity, coating thickness, and conductivity, as will be appreciated by those skilled in the art. In general, thinner coatings and larger pore sizes will promote mass transport across the coating. The formation of very large pores, however, tends to result in diminished contact between the carbon particles of the micro-porous layer and active regions of the catalyst, and thus reduces efficiency of a fuel cell for a given loading of carbon particles. Namely, there will be a need to employ routine experimentation to optimize the microporous layer 5 for a particular application.

In one embodiment of the present invention, the fibrils making up the carbon paper are partially coated by a coalesced copolymer of tetrafluoroethylene and perfluorosulfonyl fluoride ethoxy propyl vinyl ether (PSEPVE) available as Nafion® Resin from DuPont, and the second microporous layer is a 10 micrometers thick layer consisting of 40% by weight of Kynar®, a copolymer of polyvinylidene fluoride and hexafluoropropylene and 60% by weight of Vulcan® XC72 carbon available from Cabot.

Fuel Cell

Figure 2:
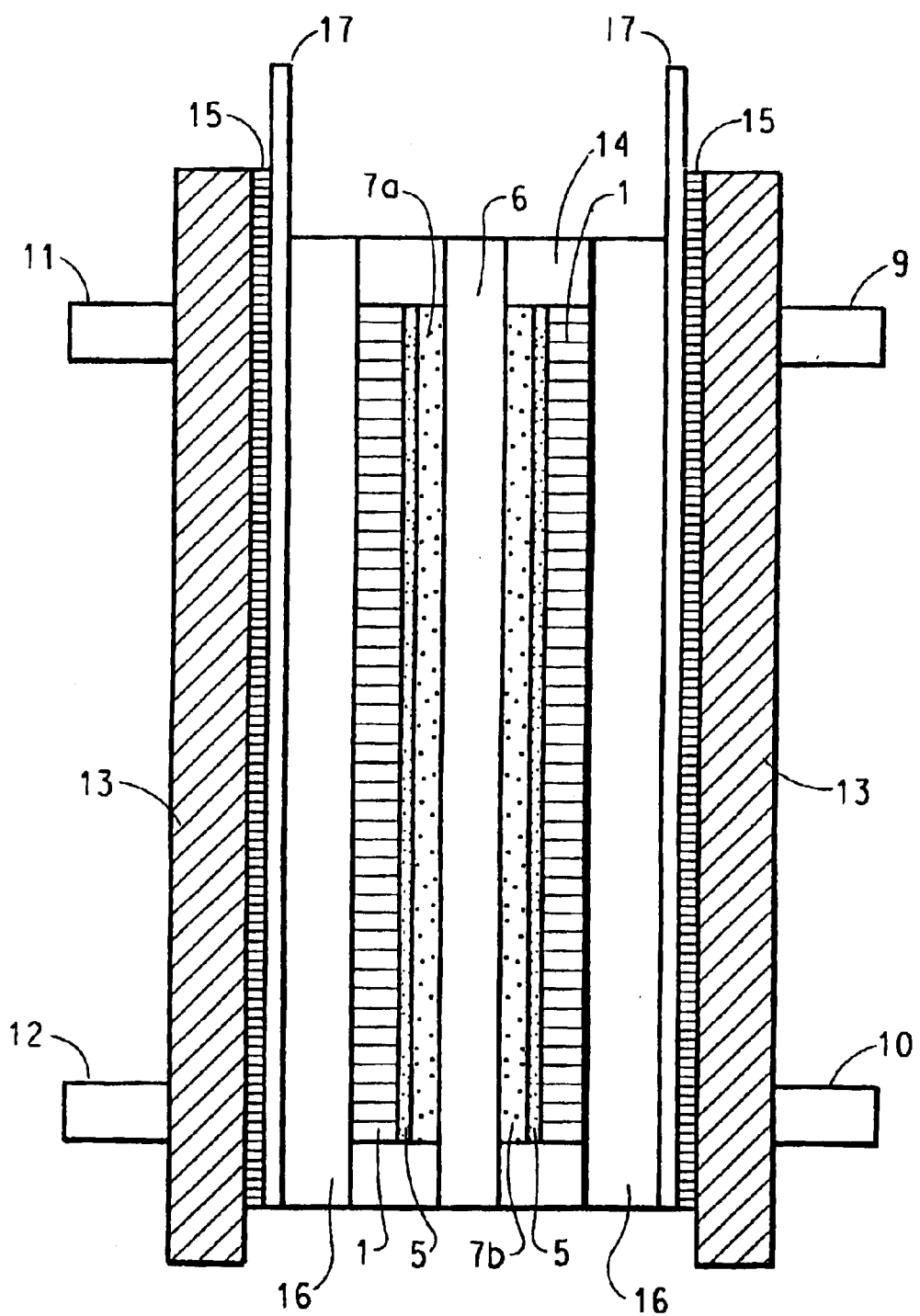
FIG. 2 depicts, in cross-section, a schematic of a representative fuel cell in which the structure of FIG. 1 has been introduced as a gas diffusion backing.

FIG. 2 depicts a typical single cell fuel cell test assembly, such as that employed in the specific embodiments described hereinbelow. Both sides of a Nafion® perfluoroionomer membrane, 6, available from E. I. du Pont de Nemours and Company, bear a catalyst layer, 7. The catalyst layer is platinum intermixed with a Nafion® perfluoroionomer binder. In some embodiments the platinum catalyst is supported on carbon particles. The coated membrane is frequently referred to in the art as a catalyst coated membrane (CCM).

A membrane electrode assembly (MEA) is formed by placing the gas diffusion backing of the present invention, having porous layer 1 and microporous layer 5, in electrically conductive contact with the catalyst layers, also known as electrodes, on both sides of the CCM. The test assembly is provided a cathode gas inlet, 9; and outlet, 10; and an anode gas or liquid inlet, 11 and outlet, 12. Aluminum end blocks, 13, are held together with tie rods (not shown). The fuel cell has sealing gasket, 14; electrical insulating layers, 15; graphite current collector blocks with flow field inscribed thereupon to assist in fuel distribution, 16; and current collectors, 17, that are typically gold plated.

In operation, oxygen (sometimes air) circulates from cathode gas inlet 9 to cathode outlet 10. A fuel that may be in gaseous or liquid form, e.g. hydrogen or a hydrocarbon, typically methanol, circulates from anode inlet 11 to anode outlet 12. The fuel reacts to liberate protons at anode catalyst layer 7a. The protons are conducted through the Nafion® layer, 6, to cathode catalyst layer 7b. Oxygen electrons and the protons from anode 7a combine at catalyst layer 7b to form water, resulting in the creation of a voltage between the anode and the cathode. Hydrogen and oxygen readily diffuse to the catalyst, and water readily passes from the catalyst, through the relatively large pores of impregnated layer 1. Electrical contact with the catalyst is improved by microporous layer 5, which provides excellent contact with individual surfaces of the catalyst. The microporous layer is sufficiently thin that it does not impede the mass transport of water, allowing the water to readily "wick" through the layer and be removed from the catalyst surface, where excess quantities of water would reduce efficiency of the fuel cell.

The present invention is further described in but not limited to the following examples. One of skill in the art will appreciate that there are many equivalent materials and structures widely known in the art of fuel cells, and that these may be freely exchanged with the corresponding materials and structures employed in the specific embodiments.

EXAMPLES

With reference to FIG. 2, the fuel cell employed in obtaining the results disclosed in the Examples was provided with a Nafion® 117 perfluoroionomer membrane available from DuPont, an 1100 equivalent weight membrane 0.007" (178 micrometers) thick. The catalyst coated membrane (CCM) was formed by applying on the anode side of the membrane a paste formed by mixing a commercially available 1:1 atomic ratio Pt:Ru catalyst with Nafion® perfluoroionomer. A similar paste of Pt only catalyst was applied to the cathode side. The concentration of both catalysts was 4 mg/cm on the membrane surface. The CCM had an active area of 100 $cm^2$.

Unless otherwise specified, the layered structure of the invention was employed as a gas diffusion backing on the cathode side and an untreated Toray TGP-H-060 was used as the gas diffusion backing on the anode side. Glass fiber reinforced silicone gaskets available from Furon, Inc., Hoosick Falls, N.Y., were employed; 0.010" thick on the cathode side and 0.007" thick on the anode side. The cell was then assembled by threading eight bolts into the tapped holes in one of the end plates, and compressed by applying a torque on each bolt of 2 foot pounds. The tests were performed with cells that were free of external leaks. Fresh catalyst coated membrane samples were used for each Example.

The serpentine flow field in the graphite blocks consisted of 30 equally spaced channels with a length of 5 cm per channel. The anode graphite block had three parallel serpentine channels running all the way from the inlet to the outlet. The cathode graphite block had a single serpentine channel running the whole length.

A 1 M aqueous solution of methanol solution was fed to the anode and compressed air (or pure oxygen) to the cathode. Air or oxygen flow was controlled by a mass flow controller (MFC) with range 0 to 10 SLPM. The methanol solution flow was controlled using a liquid gear pump. The MFC was calibrated by using a bubble flow meter. The temperature of the methanol solution entering the cell was controlled at the cell temperature of 80° C. with the help of a pre-heater arrangement.

The samples were conditioned by cycling the cell voltage between OCV (open circuit voltage) and 0.2 V a few times before the polarization data were obtained. Tests were done at different air flow rates, with the initial flow rate set at 0.1 $SLPM/cm^2$. The fuel (methanol solution) flow rate was maintained at a constant value of 50 cc/min during the experiments. Each of the tests comprised of recording a polarization curve followed by recording steady state at several set voltage (0.2 and 0.5V) and current (0.1 and 0.2A/cm2) set points. Power density was determined by connecting a load box to the cell set to draw power at a constant 0.4 volts. The current was then measured as a function of air flow rate and was plotted as power density (current density×voltage) versus flow rate.

Example 1
Toray H60 Carbon Paper Treated With SO2F Nafion® Then Coated With Kynar® 2801/Vulcan Carbon/propylene carbonate (PC)

Sheets of Toray TGP-H-060 carbon paper, 25 cm×45 cm, (Toray Industries, Tokyo, Japan) having a bulk density of 0.46 g/ml, a gas permeability of 30 mm Aq/mm, electrical resistivity through plane of 0.07 ohm cm and an average thickness of about 180 microns, was soaked in a solution earlier prepared by diluting 30 grams of a 10 wt % solution of Nafion® in the sulfonyl fluoride form, available from the DuPont Company, in Fluorinert FC70-3M Company, St. Paul, Minn.) in 220 grams of Fluorinert® FC-40. After soaking the carbon paper in the thus prepared solution for 2 minutes and air drying overnight, the carbon paper held 0.45 $mg/cm^2$ of the Nafion®. The dried carbon paper so prepared was baked in an oven at 150° C. for 1 hour.

A slurry was prepared by first mixing 685 grams of acetone with 90 grams of propylene carbonate, high boiling component, and 30 grams of Kynar® 2801 (Atochem North America), a copolymer of polyvinylidene fluoride and hexafluoropropylene, for 30 minutes with a mixing impeller driven by an air motor. 45 grams of Vulcan® XC-72 carbon powder (Cabot Corporation, Boston Mass.) were added to the mixture so formed. 850 grams of Zirconium cylindrical beads (0.25 inch diameter by 0.25 inch long) were then added to the resultant mixture followed by rolling the container with an air driven roller mill at 60 rpm for 6 to 8 hours at room temperature. After rolling, the slurry was screened with a container lid having 0.0625 inch diameter holes drilled in it.

The coating slurry so prepared was applied to the carbon paper using a #45 Meyer rod with 0.4 mm spacers under each end of the rod. The Meyer rod was pulled over the top of the treated paper manually. The coated treated carbon paper was then air dried over night. After drying, the carbon paper was baked in an oven in air for 2 hours at 93° C. to remove the propylene carbonate. The coating concentration was 2 $mg/cm^2$.

Figure 3:
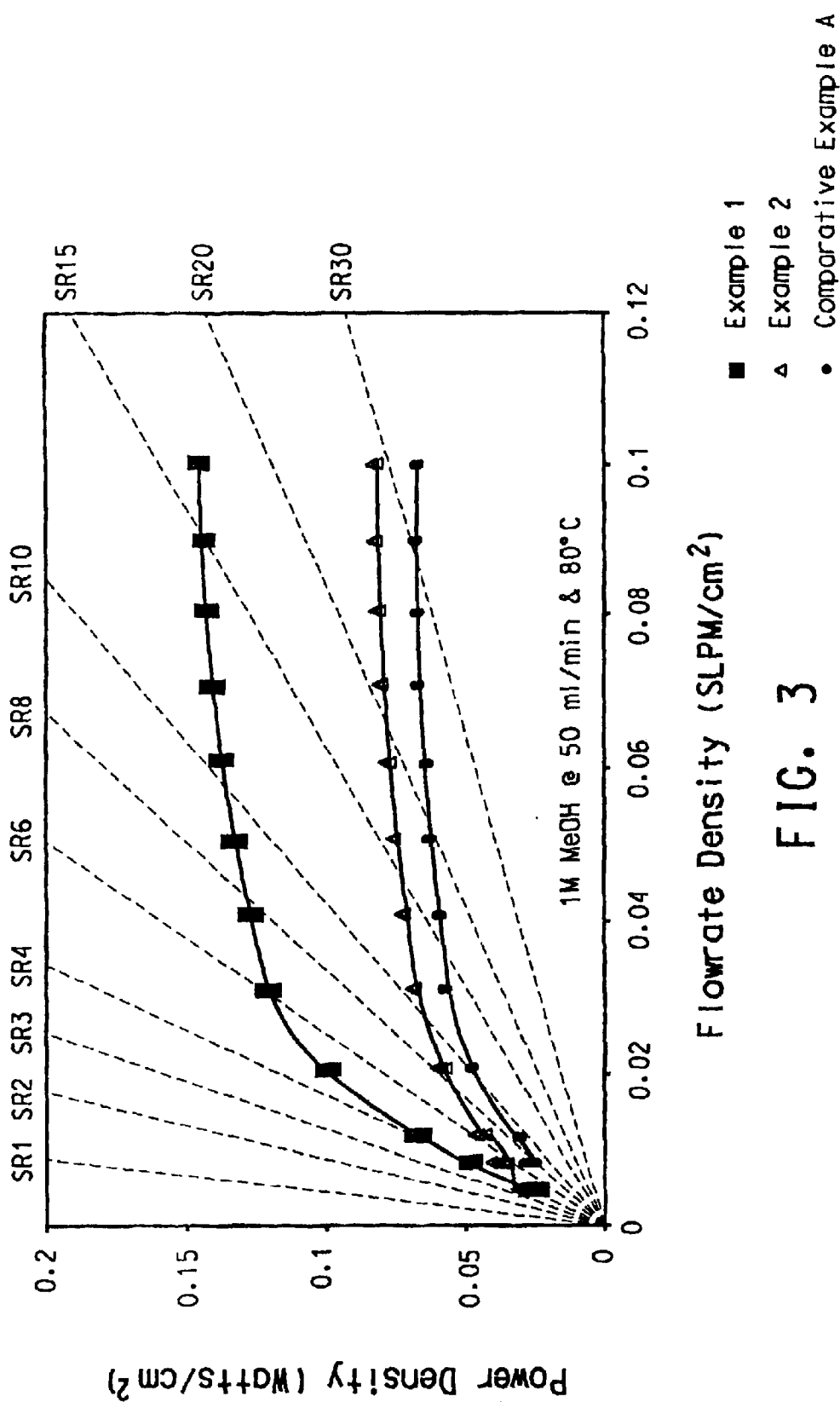
FIG. 3 depicts power density versus air flow rate for direct methanol fuel cells employing gas diffusion backings of this invention on the cathode side of the fuel cell, and a comparison with a fuel cell not practicing the invention.

The coated carbon paper thus prepared was tested in a fuel cell as described above. The power density as a function of air flow rate at a constant potential of 0.4V is shown as Example 1 in FIG. 3.

Example 2
Toray H60 Carbon Paper Treated With SO3H Nafion® Then Coated With Kynar® 2801/Vulcan Carbon/propylene carbonate (PC)

12 g of a suspension of 25% by weight of sulfonic acid-form Nafione® Perfluroionomer in water/ethanol/propanol, available from the DuPont Company, was diluted with 80 grams of de-ionized water, 80 grams ethanol, and 80 grams n-propanol. A second specimen of Toray TGP-H-060 carbon paper, 25 cm×45 cm was soaked for 2 minutes in the thus diluted suspension and was air dried overnight. The following day the composite was baked in an oven at 300 F. for 2 hr to coalesce the Nafion®. At this point the carbon paper held 1.2 grams SO3H Nafion®/cm2.

A coating slurry was formed according to the method of Example 1, except that only 535 g of acetone were used. Roll milling proceeded for six hours.

The so prepared coating slurry was applied to the carbon paper using a #45 Meyer rod with 0.4 mm spacers at each end of the rod. The coated treated carbon paper was then air dried over night. After drying, the carbon paper was baked in an oven in air for 2 hours at 200 F. to remove the propylene carbonate. The resulting coating concentration was 1.2 mg/cm$^2$.

The specimen so prepared was tested according to the method described in Example 1. The power density versus air flow rate at 0.4V potential is shown as Example 2 in FIG. 3.

Comparative Example A

The anode gas diffusion backing was Toray TGP-H-060 carbon paper as received from the vendor.

To prepare the cathode gas diffusion backing, Toray TGP-H-060 paper was immersed for 1 minute in a 10% by weight suspension of polytetrafluoroethylene 30 (PTFE) in water. The paper was air dried at room temperature. Concentration of PTFE was 1.5 mg/cm$^2$.

A suspension was made by mixing with an impeller 23.5 grams of pTFE 30 suspension, 176.5 grams of a 4 wt % Elvanol 90/50 (96% water), and 21.2 grams of Vulcan XC72 carbon. After moderate mixing for 15 minutes, 850 grams of zirconium beads (0.25 inch diameter by 0.25 inch long) were added and this suspension was media milled for 8 hrs, then coated on the dried, treated Toray paper with a #45 Meyer rod with 0.4 mm spacers at each end. The resulting composite was air dried at room temperature overnight to remove the water. The composite was then sintered at 370° C. for 2 hrs. This resulted in a micro-porous layer 5.3 mg/cm$^2$.

The coated paper so prepared was tested according to the method of Example 1. The power density versus air flow rate at 0.4 V constant potential is shown as Comparative Example A in FIG. 3.

Example 3
Toray H60 Carbon Paper Treated With Kynar® 2801 Then Coated With Kynar® 2801/Vulcan Carbon/propylene carbonate (PC)

12.5 grams of Kynar® 2801 was dissolved at room temperature in 237.5 grams of acetone to form a solution. Toray TGP H-060 carbon paper, 23 cm×25 cm was immersed for 2 minutes in the solution so prepared to form a treated carbon paper. The treated carbon paper was air dried at room temperature overnight. The concentration of Kynar® in the treated paper was found to be 1.4 mg/cm2.

A coating slurry was prepared in the manner of Example 1, except that only half the amount was prepared. Roll milling for six hours was accomplished in the presence of 850 g of Zirconium beads. The slurry was applied to the carbon paper using a # 45 Meyer rod with 0.4 mm spacers under each end of the rod. The coated treated carbon paper was then air dried over night. After drying, the carbon paper was baked in an oven in air for 2 hours at 93° C. to remove the propylene carbonate. The resulting coating concentration was 3.5 mg/cm$^2$.

Dry nitrogen adsorption/desorption measurements were performed at 77.3° K. on Micromeritics ASAP® model 2400/2405 porosimeters. Samples were degassed at 150° C. overnight prior to data collection. Surface area measurements utilized a five-point adsorption isotherm collected over 0.05 to 0.20 p/p$_0$ and analyzed via the BET method as described in S. Brunauer et al, *J. Amer. Chem. Soc.*, 60, 309(1938).

The BET surface area of the specimen so prepared was found to be 6.4 m$^2$/g. The BET surface area of untreated Toray H60 carbon paper as received was found to be ca. 0.40 m$^2$/g.

Figure 4:
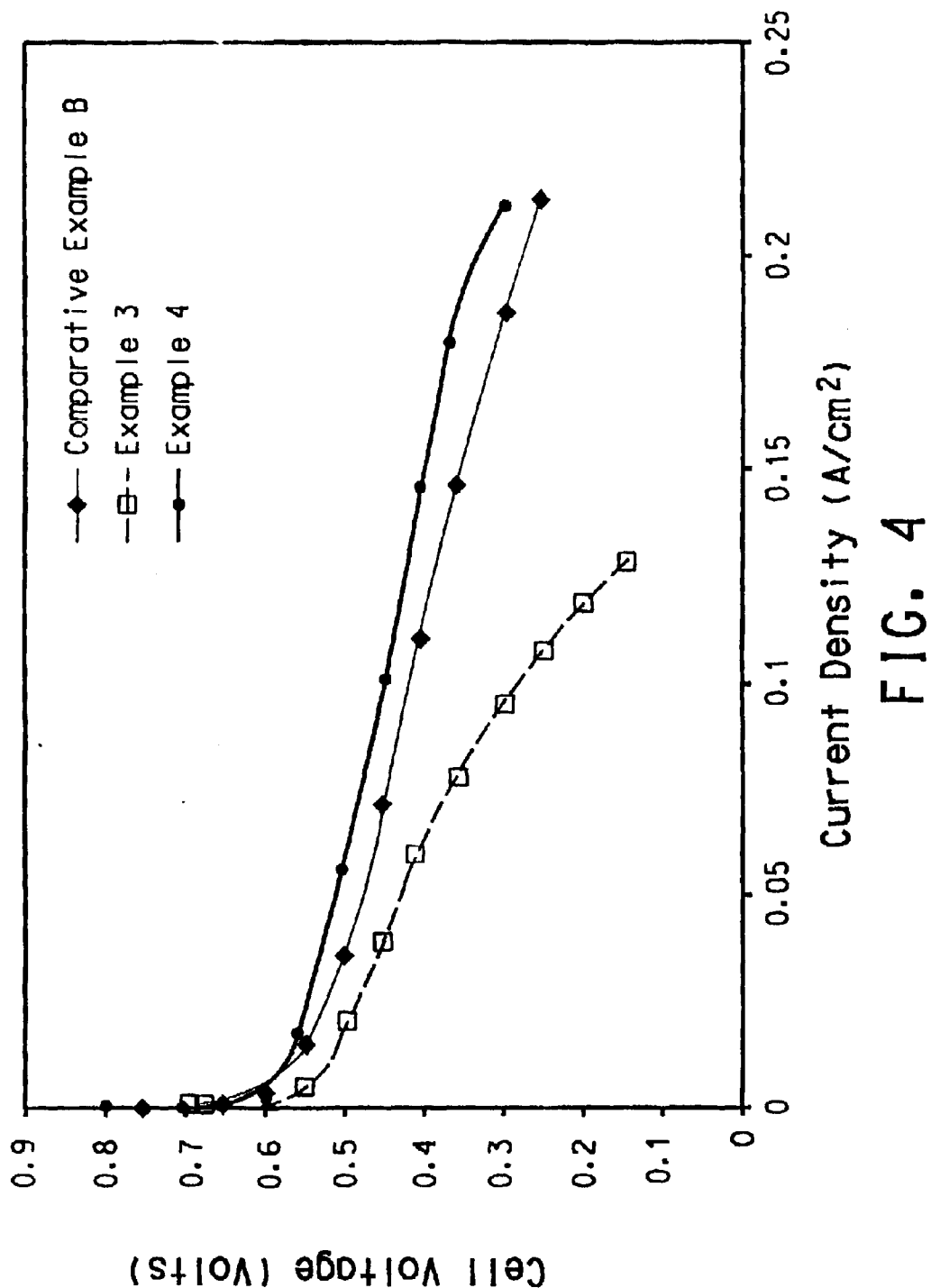
FIG. 4 depicts polarization curves for direct methanol fuel cells employing gas diffusion backings of the invention on the cathode side of the fuel cell, and a comparison with a fuel cell not practicing the invention.

The coated, treated carbon paper was then incorporated as a Gas Diffusion Backing in a fuel cell and a polarization curve determined. The polarization curve generated at 65° C. at 0.5 L/min air flow is shown in FIG. 4.

Example 4
Toray H60 Carbon Paper Treated With SO3H Nafion® Then Coated with SO3H Nafion®/Vulcan Carbon.

12 g of a water/ethanol/n-propanol suspension containing 25% by weight of Nafion® perfluorosulfonic acid, EW 1100, was diluted by combining with 240 grams of a 1:1:1 mixture of ethanol, n-propanol and de-ionized water. Toray TGP-H-060 carbon paper was immersed in the dilute suspension for 2 minutes. After immersion, the specimen was air dried at room temperature overnight. The dried sample had a concentration of 0.25 mg/cm2 of the Nafion® polymer in sulfonic acid form.

The coating slurry was prepared by adding 10 grams of Vulcan XC 72 carbon powder (Cabot Corporation, Boston Mass.) to 50 grams of de-ionized water then adding 40 grams of the 25% Nafion® suspension. To this mixture, 850 grams of zirconium beads (0.25 inch diameter by 0.25 inch long) were added and the slurry roll milled for 6 hours, after which the slurry was separated from the Zirconium beads according to the method of Example 1.

This coating slurry was applied to the carbon paper using a #45 Meyer rod with 0.4 mm spacers under each end of the rod. The coated treated carbon paper was then air dried at room temperature, over night. After drying, the carbon paper was baked in an oven in air for 2 hours at 150° C. The coating concentration was 3.4 mg/cm2.

The polarization curve determined from this sample is shown as Example 4 in FIG. 4.

Comparative Example B

A fuel cell was prepared as in Example 3 and 4, except that the gas diffusion backing on the cathode side was not the layered structure of the invention but was simply a commercially available gas diffusion backing commonly employed in the art, namely ELAT/NC/SSV2 available from ETEK, Inc, a division of DeNora NA, Inc. The polarization curve is shown as Comparative Example B in FIG. 4.

What is claimed is:

1. A gas diffusion backing adapted for use in fuel cells consisting essentially of a porous first layer and a microporous second layer in electrically conductive contact therewith, said first layer consisting essentially of a porous carbonaceous paper or fabric comprising carbon fibers, wherein the carbon fibers comprise at least 50% by volume of the layer, said fibers being at least partially coated by a first fluorinated polymer disposed thereupon, and said second layer consisting essentially of a second fluorinated polymer having carbon particles intermixed therewith, the first and second fluorinated polymers (i) being the same or different, (ii) each being a melt processable polymer selected from the group consisting of:
   (a) amorphous polymers having a glass transition temperature (Tg) of less than about 250° C.;
   (b) crystalline or semi-crystalline polymers having a melting point of less than about 315° C.; and
   (c) mixtures thereof.

2. The gas diffusion backing of claim 1 wherein the melt processable polymer is an amorphous polymers having a glass transition temperature (Tg) of less than about 250° C.

3. The gas diffusion backing of claim 1 wherein the melt processable polymer is a crystalline or semi-crystalline polymers having a melting point of less than about 315° C.

4. The gas diffusion backing of claim 3 wherein the melting point is less than 265° C.

5. The gas diffusion backing of claim 4 wherein the melting point is less than 250° C.

6. The gas diffusion backing of claim 1, 2, or 3 wherein the the first and second fluorinated polymers have a weight average molecular weight of less than 500,000 Daltons.

7. The gas diffusion backing of claim 1, 2, or 3 wherein the first and second fluorinated polymers are hydrophobic.

8. The gas diffusion backing of claim 1, 2, or 3 wherein the first and second fluorinated polymers are hydrophilic.

9. The gas diffusion backing of claim 1, 2, or 3 wherein the first fluorinated polymer is hydrophilic and the second fluorinated polymer is hydrophobic.

10. The gas diffusion backing of claim 8 wherein said hydrophilic polymer has ionic moieties.

11. The gas diffusion backing of claim 9 wherein said hydrophilic polymer has ionic moieties.

12. The gas diffusion backing of claim 7 wherein said hydrophobic polymer is a copolymer of vinylidene fluoride, tetrafluoroethylene, and optionally a monomer selected from the group consisting of hexafluoropropylene, perfluoroalkylvinylethers, and perfluorosulfonylfluoridealkoxyvinylethers.

13. The gas diffusion backing of claim 9 wherein said hydrophobic polymer is a copolymer of vinylidene fluoride, tetrafluoroethylene, and optionally a monomer selected from the group consisting of hexafluoropropylene, perfluoroalkylvinylethers, and perfluorosulfonylfluoridealkoxyvinylethers.

14. The gas diffusion backing of claim 12 wherein said hydrophobic polymer is a copolymer of vinylidene fluoride and hexafluoropropylene.

15. The gas diffusion backing of claim 13 wherein said hydrophobic polymer is a copolymer of vinylidene fluoride and hexafluoropropylene.

16. The gas diffusion backing of claim 7 wherein said hydrophobic polymer is a copolymer of tetrafluoroethylene and a monomer represented by the formula $$CF_2=CF-[O-CF_2CF(R)]_a-OCF_2CF_2SO_2F$$

wherein a is 0, 1 or 2; and R is F, or $C_nF_{2n+1}$ where n is 1,2,3, or 4.

17. The gas diffusion backing of claim 9 wherein said hydrophobic polymer is a copolymer of tetrafluoroethylene and a monomer represented by the formula $$CF_2=CF-[O-CF_2CF(R)]_a-OCF_2CF_2SO_2F$$

wherein a is 0, 1 or 2; and R is F, or $C_nF_{2n+1}$ where n is 1,2,3, or 4.

18. The gas diffusion backing of claim 16 wherein R is $-CF_3$ and a is 1.

19. The gas diffusion backing of claim 8 wherein said hydrophilic polymer is an ionomer having monomer units represented by the formula:

$$-CX_1X_2-CX_3X_4-$$

where each X is independently a halogen or fluorine, with the proviso that at least two of $X_{1-4}$ are fluorines; or a perfluoroalkenyl monomer having an ionic pendant group represented by the formula:

$$-(O-CF_2CFR)_a-O-CF_2(CFR')_bSO_3-H^+$$

wherein R and R' are independently selected from F, Cl and a perfluorinated alkyl group having 1 to 10 carbon atoms; a is 0, 1 or 2; and b is 0 to 6.

20. The gas diffusion backing of claim 9 wherein said hydrophilic polymer is an ionomer having monomer units represented by the formula:

$$-CX_1X_2-CX_3X_4-$$

where each X is independently a halogen or fluorine, with the proviso that at least two of $X_{1-4}$ are fluorines; or a perfluoroalkenyl monomer having an ionic pendant group represented by the formula:

$$-(O-CF_2CFR)_a-O-CF_2(CFR')_bSO_3-H^+$$

wherein R and R' are independently selected from F, Cl and a perfluorinated alkyl group having 1 to 10 carbon atoms; a is 0, 1 or 2; and b is 0 to 6.

21. The gas diffusion backing of claim 19 wherein $X_{1-4}$ are all fluorines; R is perfluoromethyl; a is 0 or 1; R' is F; and b is 1.

22. The gas diffusion backing of claim 7 wherein said hydrophobic polymer is a copolymer of tetrafluoroethylene and a monomer selected from the group of hexafluoropropylene; perfluoroalkyl vinyl ethers; 2,2-bistrifluoromethyl-4,5-difluoro-1,3-dioxole; and mixtures thereof.

23. The gas diffusion backing of claim 9 wherein said hydrophobic polymer is a copolymer of tetrafluoroethylene and a monomer selected from the group of hexafluoropropylene; perfluoroalkyl vinyl ethers; 2,2-bistrifluoromethyl-4,5-difluoro-1,3-dioxole; and mixtures thereof.

24. The gas diffusion backing of claim 1, 2, or 3 wherein said first layer contains 0.05 to 25 mg/cm² of said first fluorinated polymer.

25. The gas diffusion backing of claim 1, 2, or 3 wherein said second layer has a thickness of 1 to 100 microns and a coating weight of 0.1 to 20 mg/cm².

26. The gas diffusion backing of claim 1, 2, or 3 wherein said second layer has a porosity of 50 to 85%.

27. The gas diffusion backing of claim 1, 2, or 3 wherein the microporous layer is applied from a composition comprising a second fluorinated polymer, carbon particles, a first component and a second component, wherein the second component has a boiling point greater than that of the first component.

28. The gas diffusion backing of claim 27 wherein the second component is a plasticizer.

29. The gas diffusion backing of claim 1, 2, or 3 wherein the first and second fluorinated polymers selected from the group consisting of a fluorinated ionomer comprising at least 6 mole % of monomer units having a fluorinated pendant group with a terminal ionic group; a copolymer or terpolymer comprising polyvinylidene flouoride and hexafluoropropylene; and mixtures thereof.

30. A process for forming a gas diffusion backing comprising:
(W) contacting a porous carbonaceous paper or fabric comprising carbon fibers with a first fluorinated polymer to impregnate said first fluorinated polymer into the paper or fabric and at least partially coat said fibers, thereby forming a porous first layer containing at least 50% by volume of carbon fibers;
(X) applying a second layer to the first layer from a composition comprising a second fluorinated polymer, carbon particles, a first component, and a second component, wherein the second component has a boiling point greater than that of the first component, and wherein the first and second fluorinated polymers are (i) the same or different, (ii) each comprises a melt processable polymer selected from the group consisting of:
- (a) amorphous polymers having a glass transition temperature (Tg) of less than about 250° C.;
- (b) crystalline or semi-crystalline polymers having a melting point of less than about 315° C.; and
- (c) mixtures thereof;

(Y) drying the first and second layers after each of steps (W) and (X), or after completion of step (X) to remove the low boiling solvent; and (Z) heating the first and second layers individually, or after they have been brought into contact, to form the gas diffusion backing having a microporous second layer in electrical contact with the first layer.

31. The process of claim 30 wherein steps (Y) and (Z) are combined and the drying is achieved at two different temperatures.

32. The process of claim 30 wherein applying, in step (X), is by coating.

33. The process of claim 30 wherein applying, in step (X), is by lamination.

34. A membrane electrode assembly comprising:
- (a) a solid polymer electrolyte membrane having a first and second surface;
- (b) at least one electrode present on either the first or second surface of the solid polymer electrolyte membrane; and
- (c) at least one gas diffusion backing adjacent to at least one electrode, wherein the gas diffusion backing consists essentially of a porous first layer and a microporous second layer in electrically conductive contact therewith, said first layer consisting essentially of a porous carbonaceous paper or fabric comprising carbon fibers, wherein the carbon fibers comprise at least 50% by volume of the layer, said fibers being at least partially coated by a first fluorinated polymer disposed thereupon, and said second layer consisting essentially of a second fluorinated polymer having carbon particles intermixed therewith, the first and second fluorinated polymers (i) being the same or different, (ii) each being a melt processable polymer selected from the group consisting of
  - (a) amorphous polymers having a glass transition temperature (Tg) of less than about 250° C.;
  - (b) crystalline or semi-crystalline polymers having a melting point of less than about 315° C.; and
  - (c) mixtures thereof.

35. The membrane electrode assembly of claim 34 wherein the solid polymer electrolyte membrane comprises a perfluorinated polymer.

36. The membrane electrode assembly of claim 34 wherein the microporous layer is applied from a composition comprising a second fluorinated polymer, carbon particles, a first component, and a second component, wherein the second component has a boiling point greater than that of the first component.

37. The membrane electrode assembly of claim 36 wherein the second component is a plasticizer.

38. The membrane electrode assembly of claim 34 wherein the first and second fluorinated polymers selected from the group consisting of a fluorinated ionomer comprising at least 6 mole % of monomer units having a fluorinated pendant group with a terminal ionic group; a copolymer or terpolymer comprising polyvinylidene flouoride and hexafluoropropylene; and mixtures thereof.

39. The membrane electrode assembly of claim 34 wherein electrodes are present on the first and second surfaces of the solid polymer electrolyte membrane.

40. A fuel cell comprising a membrane electrode assembly, wherein the membrane electrode assembly comprises:
- (a) a solid polymer electrolyte membrane having first and second surfaces;
- (b) at least one electrode present on either the first or second surface of the solid polymer electrolyte membrane; and
- (c) a gas diffusion backing adjacent to at least one electrode, wherein the gas diffusion backing consists essentially of a porous first layer and a microporous second layer in electrically conductive contact therewith, said first layer consisting essentially of a porous carbonaceous paper or fabric comprising carbon fibers, wherein the carbon fibers comprise at least about 50% by volume of the layer, said fibers being at least partially coated by a first fluorinated polymer disposed thereupon, and said second layer consisting essentially of a second fluorinated polymer having carbon particles intermixed therewith, the first and second fluorinated polymers (i) being the same or different, (ii) each being a melt processable polymer selected from the group consisting of
  - (a) amorphous polymers having a glass transition temperature (Tg) of less than about 250° C.;
  - (b) crystalline or semi-crystalline polymers having a melting point of less than about 315° C.; and
  - (c) mixtures thereof.

41. The fuel cell of claim 40 wherein the solid polymer electrolyte membrane comprises a perfluorinated polymer.

42. The fuel cell of claim 40 wherein the microporous layer is applied from a composition comprising a second fluorinated polymer, carbon particles, a first component, and a second component, wherein the second component has a boiling point greater than that of the first component.

43. The fuel cell of claim 42 wherein the second component is a plasticizer.

44. The fuel cell of claim 40 wherein the first and second fluorinated polymers selected from the group consisting of a fluorinated ionomer comprising at least 6 mole % of monomer units having a fluorinated pendant group with a terminal ionic group; a copolymer or terpolymer comprising polyvinylidene flouoride and hexafluoropropylene; and mixtures thereof.

45. The fuel cell of claim 40 wherein electrodes are present on the first and second surfaces of the solid polymer electrolyte membrane.

46. The fuel cell of claim 45 wherein electrodes are present on the first and second surfaces of the solid polymer electrolyte membrane are an anode and a cathode.

47. The fuel cell of claim 45 further comprising a cathode gas inlet; and outlet; an anode gas or liquid inlet and outlet; end blocks, a sealing gasket; electrical insulating layers; graphite current collector blocks with flow field inscribed thereupon and current collectors.

48. The gas diffusion backing of claim 17 wherein R is —$CF_3$ and a is 1.

49. The gas diffusion backing of claim 20 wherein $X_{1-4}$ are all fluorines; R is perfluoromethyl; a is 0 or 1; R' is F; and b is 1.

* * * * *